United States Patent
Duanmu et al.

(10) Patent No.: US 11,938,540 B2
(45) Date of Patent: Mar. 26, 2024

(54) THERMAL COMPENSATION INSULATION FOR SEPARATION OF HEATING AND COOLING ELEMENTS IN MANUFACTURING SYSTEMS

(71) Applicant: Seurat Technologies, Inc., Mountain View, CA (US)

(72) Inventors: Ning Duanmu, Nashua, NH (US); James A. DeMuth, Woburn, MA (US); Andrew J. Bayramian, Marblehead, MA (US); Yiyu Shen, Tewksbury, MA (US); Drew W. Kissinger, Carlisle, MA (US); Robbert van der Bijl, Deerfield, NH (US); Susanne Kras, Chelmsford, MA (US); Joseph Gillespie, Boxford, MA (US)

(73) Assignee: Seurat Technologies, Inc., Wilmington, MA (US)

( * ) Notice: Subject to any disclaimer, the term of this patent is extended or adjusted under 35 U.S.C. 154(b) by 2 days.

(21) Appl. No.: 17/348,534

(22) Filed: Jun. 15, 2021

(65) Prior Publication Data
US 2021/0387264 A1    Dec. 16, 2021

Related U.S. Application Data

(60) Provisional application No. 63/039,315, filed on Jun. 15, 2020.

(51) Int. Cl.
*B22F 12/17*    (2021.01)
*B22F 10/28*    (2021.01)
(Continued)

(52) U.S. Cl.
CPC .............. *B22F 12/17* (2021.01); *B22F 10/28* (2021.01); *B22F 12/20* (2021.01); *B22F 12/43* (2021.01);
(Continued)

(58) Field of Classification Search
None
See application file for complete search history.

(56) References Cited

U.S. PATENT DOCUMENTS

| | | | |
|---|---|---|---|
| 11,433,619 B1 * | 9/2022 | Mansouri | B29C 64/30 |
| 2002/0006696 A1 * | 1/2002 | Akram | B33Y 80/00 |
| | | | 438/200 |

(Continued)

FOREIGN PATENT DOCUMENTS

JP    2008032341 A   *  2/2008

OTHER PUBLICATIONS

JP 2008/032341 translation (Year: 2022).*
JP 2008032341 A translation (Year: 2023).*

*Primary Examiner* — Xiao S Zhao
*Assistant Examiner* — Guy F Mongelli
(74) *Attorney, Agent, or Firm* — David R. Stevens; Stevens Law Group

(57) ABSTRACT

A manufacturing system includes a printer chamber having a printer bed that supports manufacturing materials and an internal heating system supported by the printer chamber. The internal heating systems is configured to direct patterned heat energy onto the printer bed and supported manufacturing materials. An external heating system is supported by or positioned near the printer chamber and configured to direct patterned heat energy onto the printer bed and any supported manufacturing materials.

20 Claims, 13 Drawing Sheets

(51) Int. Cl.
*B22F 12/20* (2021.01)
*B22F 12/43* (2021.01)
*B22F 12/90* (2021.01)
*B29C 64/153* (2017.01)
*B29C 64/273* (2017.01)
*B29C 64/295* (2017.01)
*B29C 64/393* (2017.01)
*B33Y 30/00* (2015.01)
*B33Y 50/02* (2015.01)

(52) U.S. Cl.
CPC ............ *B22F 12/90* (2021.01); *B29C 64/153* (2017.08); *B29C 64/273* (2017.08); *B29C 64/295* (2017.08); *B29C 64/393* (2017.08); *B33Y 30/00* (2014.12); *B33Y 50/02* (2014.12)

(56) References Cited

U.S. PATENT DOCUMENTS

| | | | |
|---|---|---|---|
| 2002/0107140 A1* | 8/2002 | Hampden-Smith | B01J 35/006 429/534 |
| 2003/0074096 A1* | 4/2003 | Das | B29C 64/153 700/119 |
| 2003/0211657 A1* | 11/2003 | Williams | B33Y 40/00 257/E23.102 |
| 2005/0242473 A1* | 11/2005 | Newell | B29C 64/153 264/497 |
| 2014/0265049 A1 | 9/2014 | Burris et al. | |
| 2014/0268604 A1* | 9/2014 | Wicker | B29C 70/82 264/445 |
| 2015/0130117 A1* | 5/2015 | Lacaze | B29C 70/682 264/482 |
| 2016/0375491 A1* | 12/2016 | Swaminathan | B29C 64/295 419/53 |
| 2017/0123237 A1* | 5/2017 | DeMuth | B33Y 80/00 |
| 2017/0232557 A1 | 8/2017 | Demuth et al. | |
| 2017/0282455 A1* | 10/2017 | DeFelice | B33Y 50/00 |
| 2018/0186067 A1 | 7/2018 | Buller et al. | |
| 2018/0186074 A1* | 7/2018 | Hull | B29C 64/268 |
| 2018/0207863 A1* | 7/2018 | Porter | B29C 64/40 |
| 2018/0272613 A1* | 9/2018 | Cieszynski | B29C 64/153 |
| 2018/0326663 A1* | 11/2018 | DeMuth | B29C 64/282 |
| 2019/0160529 A1* | 5/2019 | Silidker | G05D 23/00 |
| 2020/0015509 A1* | 1/2020 | Weinstein | B33Y 30/00 |
| 2020/0061922 A1 | 2/2020 | Meiners et al. | |
| 2020/0094478 A1* | 3/2020 | Zediker | B22F 10/20 |

* cited by examiner

THERMAL COMPENSATION INSULATION FOR SEPARATION OF HEATING AND COOLING ELEMENTS IN MANUFACTURING SYSTEMS

CROSS-REFERENCE TO RELATED PATENT APPLICATION

The present disclosure is part of a non-provisional patent application claiming the priority benefit of U.S. Patent Application No. 63/039,315, filed on Jun. 15, 2020, which is incorporated by reference in its entirety.

TECHNICAL FIELD

The present disclosure generally relates to a system and method for thermally controlled additive manufacturing. In one embodiment a manufacturing bed, wall, and top can be thermally controlled to compensate for heat losses.

BACKGROUND

Traditional component machining often relies on removal of material by drilling, cutting, or grinding to form a part. In contrast, additive manufacturing, also referred to as 3D printing, typically involves sequential layer by layer addition of material to build a part. Beginning with a 3D computer model, an additive manufacturing system can be used to create complex parts from a wide variety of materials.

One additive manufacturing technique known as powder bed fusion (PBF) uses one or more focused energy sources, such as a laser or electron beam, to draw a pattern in a thin layer of powder by melting the powder and bonding it to the layer below to gradually form a 3D printed part. Powders can be plastic, metal, glass, or ceramic. This technique is highly accurate and can typically achieve feature sizes as small as 150-300 um. Typically, this process is carried out with the substrate temperature starting at room temperature or at some moderately elevated temperature such as 250C. When printing a material such as steel with a melting point around 1400C, a laser must melt both the powder and the substrate during the layer printing process. Since both of these components start at near room temperature, they must undergo a temperature cycle on the order of 1000 degrees Celsius. As this process is repeated for all the portions of the layer to be printed, thermal stresses can build within the part. Furthermore, depending on the amount of average laser power, this heat load to the printing process causes the temperature of the build plate to increase. This temperature increase during the course of the print can be significant and is dependent on the amount of parts and part geometry printed. This layer to layer variance in average heat load can cause unforeseen errors such as spatially dependent thermal warpage in all three dimensions, higher residual stresses, and even cracking of the printed part. These factors decrease part accuracy, strength, and usefulness of finished 3D parts.

Additive manufacturing systems can also require the 3D print to be removed from a controlled printing environment when the 3D print is removed from the print chamber. This can adversely affect 3D prints that require a heat treatment oven for post processing cool down and/or subsequent stress relief, annealing, or heat treatment. While additive manufacturing systems can pre-heat print plates and/or keep prints at a set temperature during printing in the print chamber, temperature control is often not available outside the print chamber. Unfortunately, when the 3D prints are removed from the print chamber, they are typically not temperature controlled and, in many systems, are also exposed to uncontrolled air. These factors can affect the material properties of the 3D print. Furthermore, 3D prints are often too hot to be immediately removed from the print chamber and so must remain in the print chamber for hours after they are done printing. This ties up the print chamber and prevents the system from starting new print jobs.

Improved thermal control systems for fixed or cartridge based print chambers are needed. This can include providing isothermal conditions, or alternatively, a patterned heat flux that can reduce errors such as spatially dependent thermal warpage in all three dimensions or higher residual stresses.

SUMMARY

A manufacturing system includes a printer chamber having a printer bed that supports manufacturing materials and an internal heating system supported by the printer chamber. The internal heating system is configured to direct patterned heat energy onto the printer bed and supported manufacturing materials. An external heating system is supported by or positioned near the printer chamber and configured to direct patterned heat energy onto the printer bed and any supported manufacturing materials.

In one embodiment, the printer chamber further comprises a cartridge.

In one embodiment, wherein the internal heating system further comprises at least one of heating elements and cooling elements.

In one embodiment, the external heating system further comprises infrared heating elements.

In one embodiment, wherein the external heating system further comprises heated gas flow.

In one embodiment, the external heating system further comprises at least one directed laser.

In one embodiment, the external heating system further comprises at least one directed laser to provide unpatterned heating.

In one embodiment, wherein the external heating system further comprises at least one directed laser to provide patterned heating.

In one embodiment, the external heating system further comprises at least one directed laser that uses recycled light.

In one embodiment, the sensors further comprise a pyrometer.

In one embodiment, the sensors further comprise a camera.

In another embodiment, a manufacturing system, includes a printer chamber having a printer bed that supports a printable material layer. A primary laser source is directable against a sub-portion of printable material layer on the printer bed to print a part pattern. A secondary heating system is configured to direct patterned heat energy into the printable material layer.

In one embodiment, the patterned heat energy is determined at least in part by printed part pattern.

In one embodiment, the patterned heat energy is substantially inversely related to a fraction of the pattern printed.

In one embodiment, a secondary heating system further comprises a second light emitting heating element.

In one embodiment, a second light emitting heating element further comprises at least one of an arc lamp, infrared lamp, LED heat system, and laser heat system.

In one embodiment, the secondary heating system further comprises a printer chamber supported patterned heating element.

In one embodiment, the printer chamber supported patterned heating element further comprises at least one of an array of resistive heat cartridges, heated fluid in channels, electrically controlled plasma sources, arc heaters, induction heaters, and microwave heaters. In all of these embodiments, cooling or heating elements could be built into the printer bed or surrounding structures, or projected from a distance.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

In the following description, reference is made to the accompanying drawings that form a part thereof, and in which is shown by way of illustrating specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

Figure 1A:
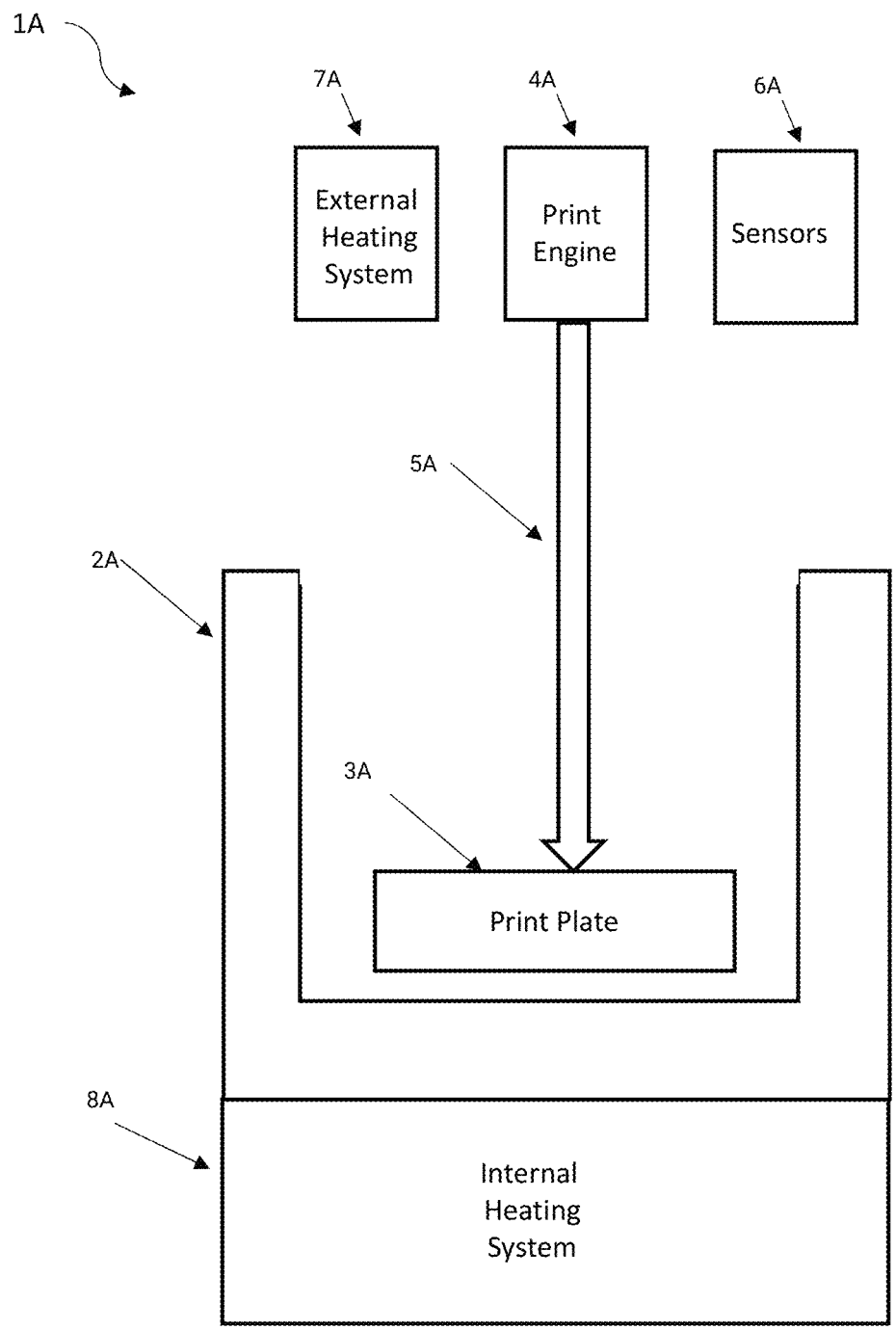
FIG. 1A illustrates a thermally controlled additive manufacturing system.

FIG. 1A illustrates a thermally controlled additive manufacturing system 1A. A print chamber 2A holds a print plate 3A that can support powder or other additive or subtractive manufacturing material. A print engine 5A capable of directing a laser, electron beam, or other directed energy 5A is externally positioned with respect to the print chamber and used to heat the manufacturing material on the print plate. Sensors 6A can be used to calibrate or provide feedback control during manufacture.

An external heating system 7A and/or an internal heating system 8A can be used to adjust or control print chamber 2A temperature, material temperature, or temperature of manufactured parts on the print plate. Both the external heating system 7A and/or an internal heating system 8A can be operated to provide differential or patterned heating or cooling using arrays of heating or cooling elements, segmented structures, partitioned structures, scannable structures, or selected on/off operation. In some embodiments, isothermal temperatures are maintained, while in other embodiments, predetermined temperatures in differing selected areas can be selected using patterned heating systems.

For example, an external patterned heating system can involve use of externally mounted or positioned assemblies that direct heat flux into a print chamber from above. Patterned assemblies can be one or more heat lamps, one or more lasers (diode, fiber, solid state, or the like), convective flow, or other type of heating element. The patterning can be achieved through a static mask, spatial light modulator such as a liquid crystal display, a light valve, an optically addressed light valve, a micro-mirror array, thermally activated patterned resonator. Heater components such as a heat lamp or heat element can generate a pattern by using a large array of elements and controlling which elements in the array turn on and off and controlling their emission through optics such as lenses, reflectors, or the like to re-direct the light to the bed in the desired pattern. Convective flow can be patterned through the use of an array of nozzles through which gas flows at controlled temperatures as desired/determined by the control system.

In some embodiments, the print plate 3A upon which the printing process is executed contains internal heater elements such as resistive heat cartridges, heated cooling fluid in cooling channels, electrically controlled plasma sources such as an arc, induction heaters, microwave heaters, or other heat generating device that are mounted within the print chamber or in contact with the print bed or chamber. Additionally, the print plate 3A can contain temperature sensing devices such as RTDs, thermocouples, pyrometers, or other temperature sensing device which then communicates the printer control system to modulate the heat flux to the print plate. The same logic is applied to the print wall except with variably controlled heaters as a function of print wall height and where the print is in the process.

Sensors 6A can include pyrometers, thermal cameras, or visual cameras. In some embodiments, a camera can take video and stills to provide a virtual window. Camera and lights can illuminate and image in multiple light wavelengths (e.g. IR, visible, or UV). The camera may be an array of several cameras that could record still and or video images from many different angles in one or many light wavelengths. The lights can be one or an array of many lights that illuminate the print chamber 2A and print plate 3A from many angles and in many different wavelengths.

In some embodiments, both the external heating system 7A and the print engine 4A can use one or more laser sources. Possible laser types include, but are not limited to: Gas Lasers, Chemical Lasers, Dye Lasers, Metal Vapor Lasers, Solid State Lasers (e.g. fiber), Semiconductor (e.g. diode) Lasers, Free electron laser, Gas dynamic laser, "Nickel-like" Samarium laser, Raman laser, or Nuclear pumped laser.

A Gas Laser can include lasers such as a Helium-neon laser, Argon laser, Krypton laser, Xenon ion laser, Nitrogen laser, Carbon dioxide laser, Carbon monoxide laser or Excimer laser.

A Chemical laser can include lasers such as a Hydrogen fluoride laser, Deuterium fluoride laser, COIL (Chemical oxygen-iodine laser), or Agil (All gas-phase iodine laser).

A Metal Vapor Laser can include lasers such as a Helium-cadmium (HeCd) metal-vapor laser, Helium-mercury (HeHg) metal-vapor laser, Helium-selenium (HeSe) metal-vapor laser, Helium-silver (HeAg) metal-vapor laser, Strontium Vapor Laser, Neon-copper (NeCu) metal-vapor laser, Copper vapor laser, Gold vapor laser, or Manganese (Mn/MnCl2) vapor laser. Rubidium or other alkali metal vapor lasers can also be used. A Solid State Laser can include lasers such as a Ruby laser, Nd:YAG laser, NdCrYAG laser, Er:YAG laser, Neodymium YLF (Nd:YLF) solid-state laser, Neodymium doped Yttrium orthovanadate(Nd:YVO4) laser, Neodymium doped yttrium calcium oxoborateNd:YCa4O (BO3)3 or simply Nd:YCOB, Neodymium glass(Nd:Glass) laser, Titanium sapphire(Ti:sapphire) laser, Thulium YAG (Tm:YAG) laser, Ytterbium YAG (Yb:YAG) laser, Ytterbium:2O3 (glass or ceramics) laser, Ytterbium doped glass laser (rod, plate/chip, and fiber), Holmium YAG (Ho:YAG) laser, Chromium ZnSe (Cr:ZnSe) laser, Cerium doped lithium strontium (or calcium)aluminum fluoride(Ce:LiSAF, Ce:LiCAF), Promethium 147 doped phosphate glass (147Pm+3:Glass) solid-state laser, Chromium doped chrysoberyl (alexandrite) laser, Erbium doped anderbium-ytterbium co-doped glass lasers, Trivalent uranium doped calcium fluoride (U:CaF2) solid-state laser, Divalent samarium doped calcium fluoride(Sm:CaF2) laser, or F-Center laser.

A Semiconductor Laser can include laser medium types such as GaN, InGaN, AlGaInP, AlGaAs, InGaAsP, GaInP, InGaAs, InGaAsO, GaInAsSb, lead salt, Vertical cavity surface emitting laser (VCSEL), Quantum cascade laser, Hybrid silicon laser, or combinations thereof.

In operation, heating devices in the print plate, print wall, and from the above the print plate can be used to apply the desired thermal condition for the initiation of printing. Throughout the printing process, thermal load on the printed layer is a variable depending on the part geometry. Use of an internal heating system 8A with heating devices in the print plate, print wall, and further use of an external heating system 7A above the print plate can provide temporal modulation of the thermal conditions in the printed part in situ. In some embodiments, use of an internal heating system 8A with heating devices in the print plate, print wall, and further use of an external heating system 7A above the print plate can provide spatial modulation of thermal conditions in the printed part in situ. Use of an internal heating system 8A with heating devices in the print plate, print wall, and further use of an external heating system 7A above the print plate can provide can be used to apply necessary thermal conditions to the finished printed part to minimize thermal stress and optimize the thermal history in the part.

Once the printing process in completed, the heating devices can be used to control the cool down of the part, or a lid/thermal insulation can be closed over the top of the print chamber 2A to maintain uniform cooling rates from all sides. Pre-heating powder or other manufacturing material before and during a print also allows for a reduction in the print energy required to achieve the same print rate, or similarly an increase in print rate for a given fixed print energy.

Figure 1B:
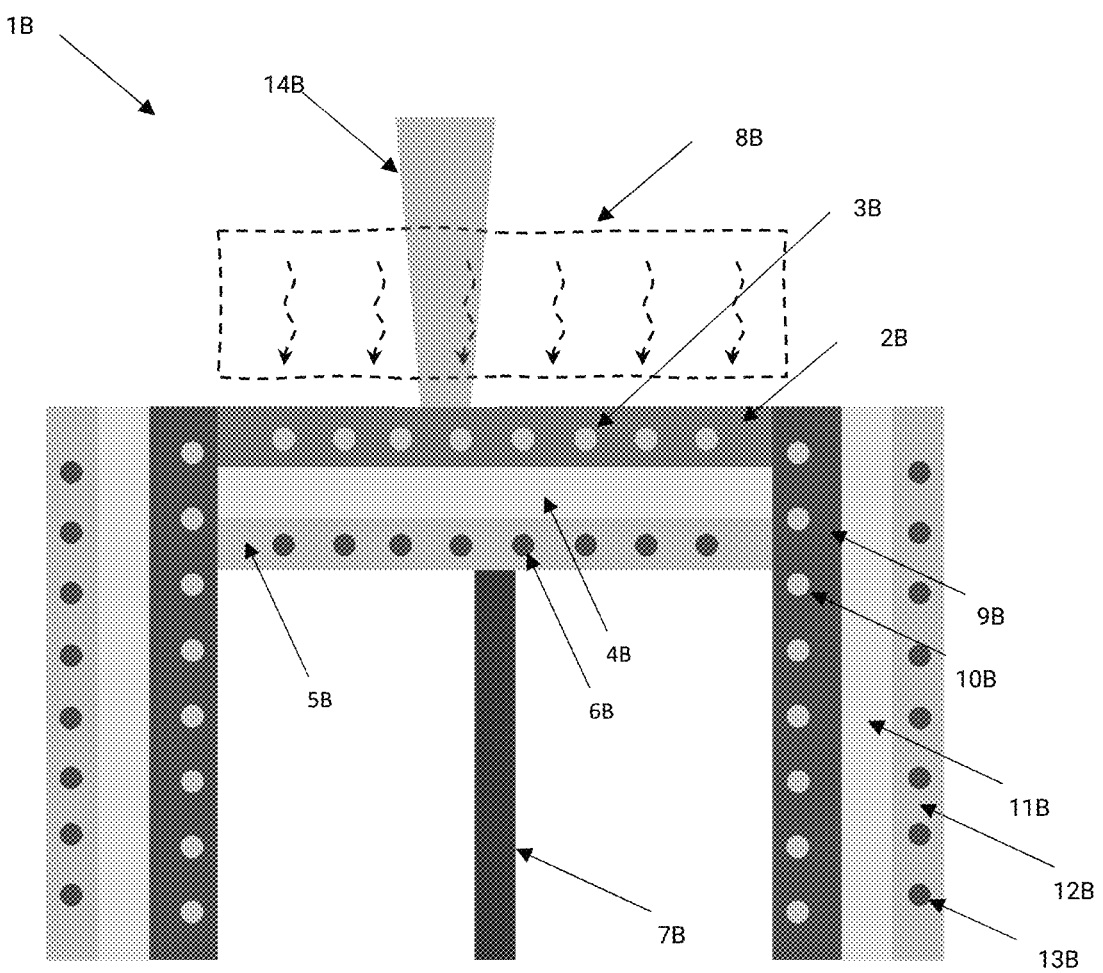
FIG. 1B illustrates a thermally controlled print plate on Z-stage before printing starts.

FIG. 1B illustrates in more detail a system 1B having a thermally controlled print plate positioned on a Z-stage before printing starts. Initially there is no powder or printed part on a print plate 2B. Laser energy 14B can be directed against material to be printed on the print plate 2B. The printer plate 2B can contain heater cartridges 3B and temperature sensing devices for controlling the temperature of the print plate 2B. Alternately, the print plate may be affixed to and thermally connected to a sub-plate which contains the heating and sensing capabilities. In this case item 2B is the sub-plate and the print plate (not shown) would be located above 2B. Below the print plate 2B, insulation 4B reduces heat loss. Below the insulation 4B is the cooling tube housing plate 5B which contains coolant flow channels 6B. This coolant flow protects sensitive and accurate system components from excessive heat. The entire print plate assembly is connected to a z-axis motor by a shaft 7B. Heat flow 8B from a patterned, unpatterned, or other radiative element is incident onto the print plate 2B from above. The magnitude of the heat flow 8B can be selected to be inversely proportional to the laser energy 14B to better maintain isothermal conditions. The printer side walls 9B contain heater elements 10B. Outside the printer side walls 9B is a layer of insulation 11B, outside of which is a print wall cooling tube side wall 12B which contains coolant flow 13B.

Figure 1C:
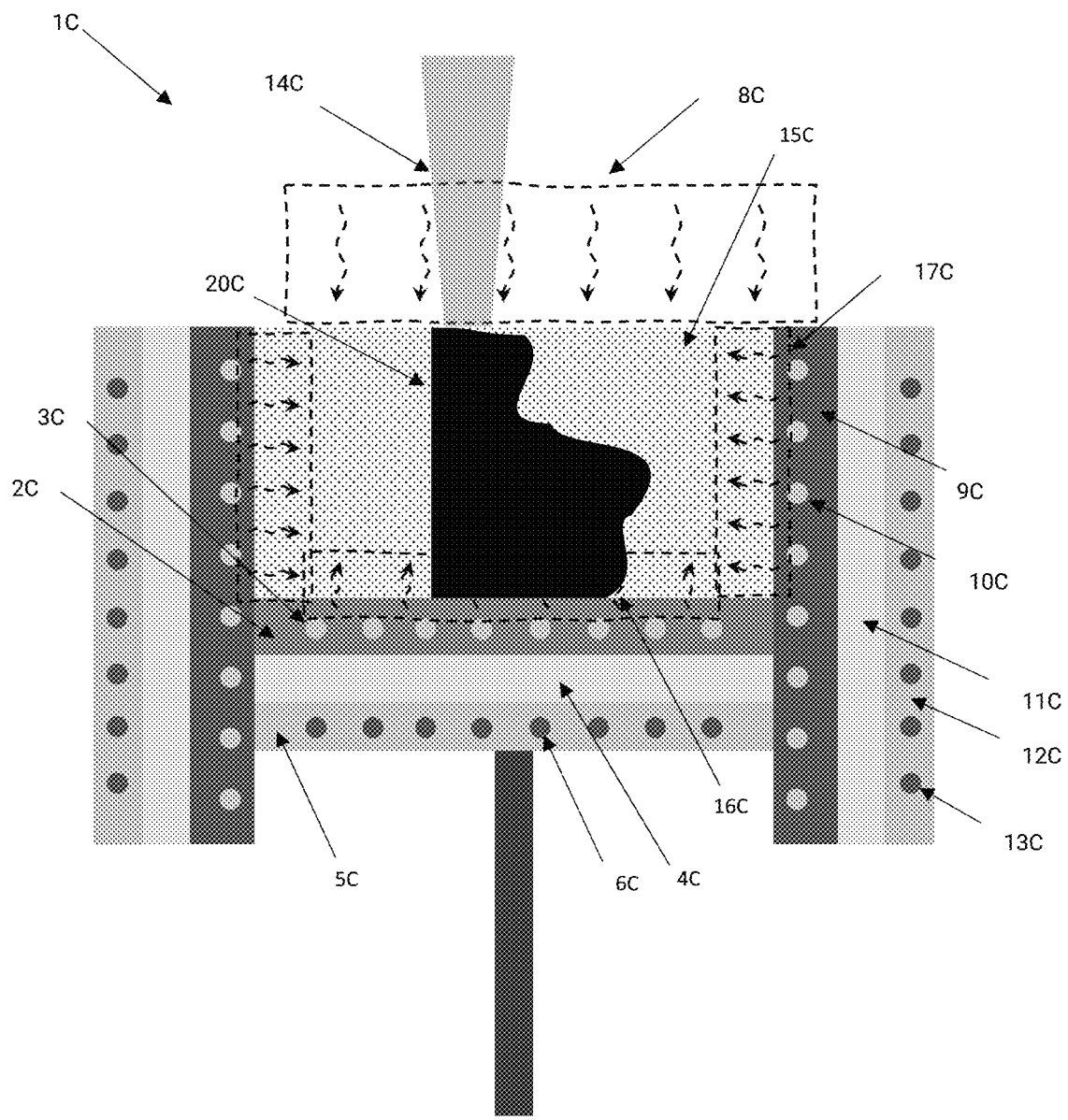
FIG. 1C illustrates a printed part buried in the powder on print plate as a Z-stage moves down, with the embedded heating devices positioned in the print plate and print wall.

FIG. 1C illustrates a system 1C having a printed part 20C buried in the powder 15C on print plate as a Z-stage moves down, with the embedded heating devices positioned in the print plate and print wall. Laser energy 14C proportional to the material to be printed is incident on the print plate 2C which contains heater cartridges 3C and temperature sensing devices for controlling the temperature of the print plate 2C. Alternately, the print plate may be affixed to and thermally connected to a sub-plate which contains the heating and sensing capabilities. In this case item 2B is the sub-plate and the print plate (not shown) would be located above 2B. Below the print plate 2C, insulation 4C reduces heat loss. Below the insulation 4C is the cooling tube housing plate 5C which contains coolant flow channels 6C. The entire print plate assembly is connected to a z-axis motor by a shaft 7C. Heat flow 8C from a patterned, unpatterned, or other radiative element is incident onto the print plate 2C from above. The magnitude of the heat flow 8C can be inversely proportional to the laser energy 1C. The printer side walls 9C contain heater elements 10C. Outside the printer side walls 9C is a layer of insulation 11C, outside of which is a print wall cooling tube side wall 12C which contains coolant flow channels 13C. Printed part 14C on the print plate is supported by the print plate 2C and surrounded by powder 15C. Conductive heat 16C from the heater cartridges in the print plate is applied to the printed part 20C. Conductive heater 17C from heater cartridges in the print wall is applied to the printed part and surrounding powder.

Figure 1D:
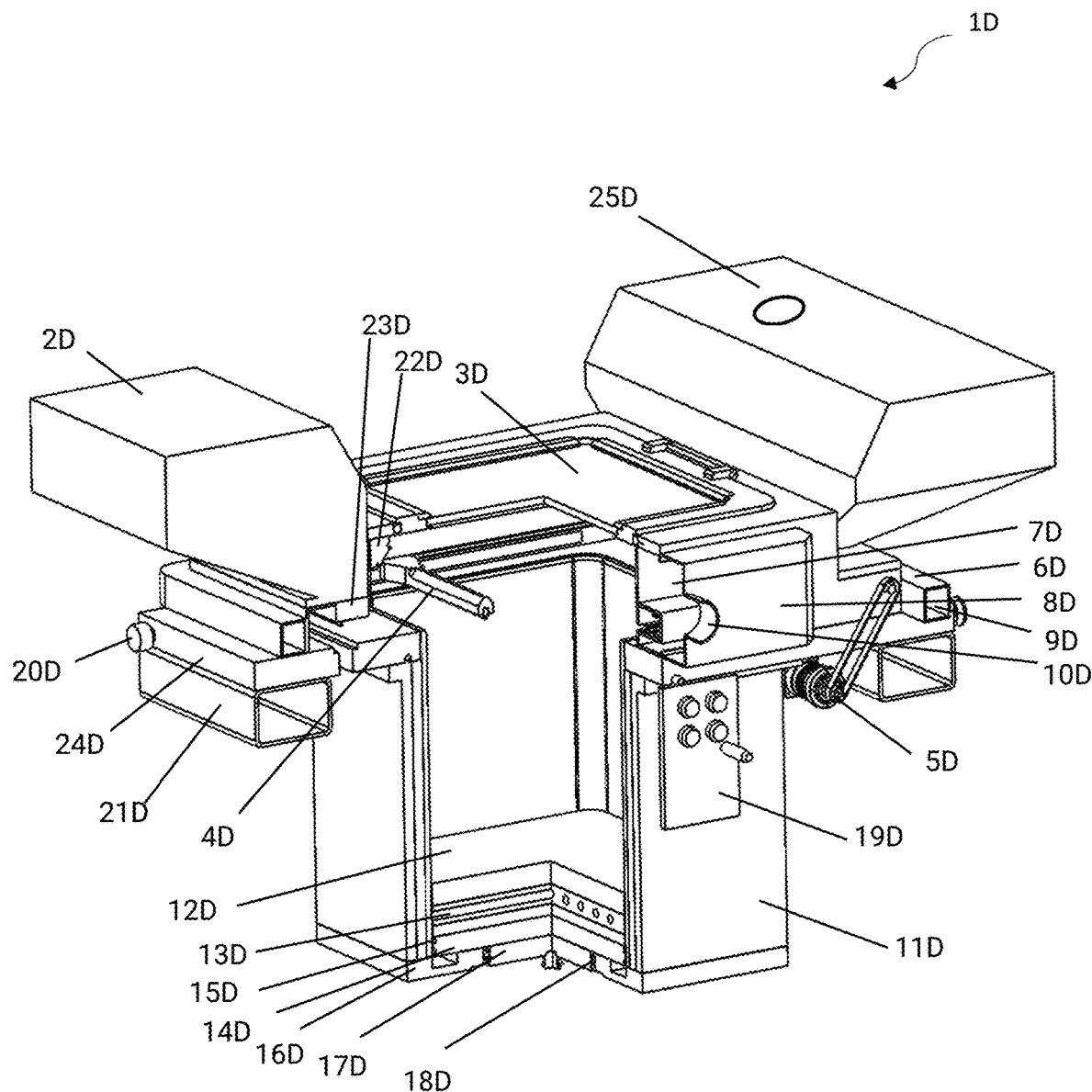
FIG. 1D illustrates a thermally controlled cartridge system.

FIG. 1D illustrates a thermally controlled cartridge system. A 3D print cartridge 1D useful in an additive manufacturing system is shown in partial cross section. The 3D print cartridge (hereinafter "cartridge") separates all of the "dirty" printing functions from the rest of the system and the operator environment. "Dirty" means wherever powder is present, processed for printing, or soot is generated. Whenever the cartridge 1D is connected to mating equipment such as a print station, powder station, or storage station, the mating equipment can supply services required to operate the cartridge as needed based on which piece of mating equipment it is mated to (e.g. the print station allows full control of the cartridge while the storage station may only provide heating power and gas recycling, and use of the camera and lights). The cartridge 1D is designed to be sealed when disconnected from mating equipment and can include auxiliary heating or cooling systems to allow for precise thermal conditions within the cartridge.

The cartridge 1D is built around a bed or base plate 24D which can include segmented or patterned internal heaters. Fresh powder for a new print is stored in the powder hoppers 2D which have the capacity to store all the powder needed for a full volume print. Fresh powder is metered onto the base plate thru the powder door 23D. Powder is swept across the plate by a powder spreader 4D using powder spreading blade(s). The powder spreader drive 5D moves the powder spreader back and forth across the print plate 12D.

A window 3D seals the top of the cartridge 1D against leaks of powder or gas and allows a laser beam (not shown) to pass through it to weld powder. The window 3A allows the access to the cartridge for loading print plates, unloading prints, cleaning and servicing the cartridge components (seals, spreader blades etc.). The inside of the cartridge 1D can be illuminated and imaged by the camera and lights 22D. The camera and lights can be either inside or outside the sealed chamber, or both, and can be positioned to take pictures and/or focus on scenes on the inside of the cartridge, in particular the print plate. The camera and lights can also be mounted on motion stages allowing the user to pan or zoom on items of interest during a print. This camera can be combined with secondary print diagnostics such as pyrometers, motion detectors, photodiodes, thermal cameras, or other sensors to automatically detect events and pan/zoom the camera to focus on the location of interest. In some embodiments, camera images can be viewed by the operator in an electronic or virtual window instead of directly viewing through a physical port or window in the cartridge.

Inert gas is supplied to the cartridge by a gas supply duct 6D so that printing can be performed in whatever atmosphere is best for each print. The gas return duct 7D removes inert gas. The gas passes thru the HEPA filter 8D which removes impurities (soot, suspended nano particles of powder, etc.). The gas then travels to a gas recycler (not shown) which is installed on mating equipment. When the cartridge is disconnected from mating equipment, a gas supply port 9D and a gas return port 10D are sealed to preserve the atmosphere inside the cartridge. Gas is subsequently purified by removing oxygen, moisture, etc. by other equipment.

The Z-axis lowers the print plate after each layer is printed so that a new layer of powder can be spread and subsequently printed. A Z-axis frame 11D holds the Z-axis components in this design. The print plate (AKA build plate) 12D is where powder is welded during printing. The print plate heater 13A contains a heating mechanism for the print plate 12D and can also insulate and/or cool a seal plate 14D. The seal plate 14D carries seals 15D, which confines the powder to the Z-axis frame 11D. The Z-axis bottom plate 16D closes off the lower end of the Z-axis frame 11D and has features to contain any powder that may slip past the seals 15D. The Plunger 17D has an interface so that it can remotely, automatically, and accurately interface with the Z-axis drive. A plunger seal 18D mates with the bottom plate 16D and further seals the cartridge 1D against powder and/or gas leaks.

An interface plate 19D contains all the inputs and outputs for the cartridge (compressed air, power, input and output signal, gas, cooling water, etc.). It is designed to make all these connections when the cartridge is connected to mating equipment. The interface can also contain a mechanism to electronically identify each cartridge when mated with mating equipment. Rollers 20D allow the cartridge 1D to be rolled onto the mating rails of mating equipment. Forklift tubes 21D allow the cartridge to be picked up and moved by a forklift.

In one embodiment, the cartridge 1D can include electronic identification such as an electronically readable memory 25D or other electronically readable indicia such as attached text or bar codes. The memory 25D can provide electronic information about the cartridge or cartridge components can be used to identify its make, model, type, powder type, or any other defining details about the unit, its sub-components, or their intended uses. This information can be used to inform a print engine about what material is to be printed, desired atmosphere (pressure and temperature), or other print related aspect so the print engine can adapt as needed to accommodate the print cartridge, sub-cartridge, or sub-assembly. The change induced could involve an action such as the automatic swapping of internal lens assemblies, adjustment of z-height/final optical throw of the lens assembly, laser parameter adjustment such as power per unit area, pulse shape, pulse duration, pulse repetition rate, wavelength, spatial pulse shape, tile size, spatial energy distribution within a tile, modify data diagnostics, data feedback algorithms, print process feedback algorithms, or algorithmic change to how tiles are put down during the print process. Electronic information from electronic memory 25D that is associated with a print cartridge or sub-cartridge can be read by a printer, de-powdering station, or storage rack to collect data on how much printing has occurred and other key metrics such as number of spreader cycles, z-axis adjustments, temperature cycles, pressure cycles, or other attribute that the cartridge or sub-cartridge have undergone along the way. This information can also be stored in a central database by the print engine, one of the subsystems, the factory automation system, de-powdering station, cartridge storage station, the cartridge itself, or other mating/interfacing equipment.

Figure 1E:
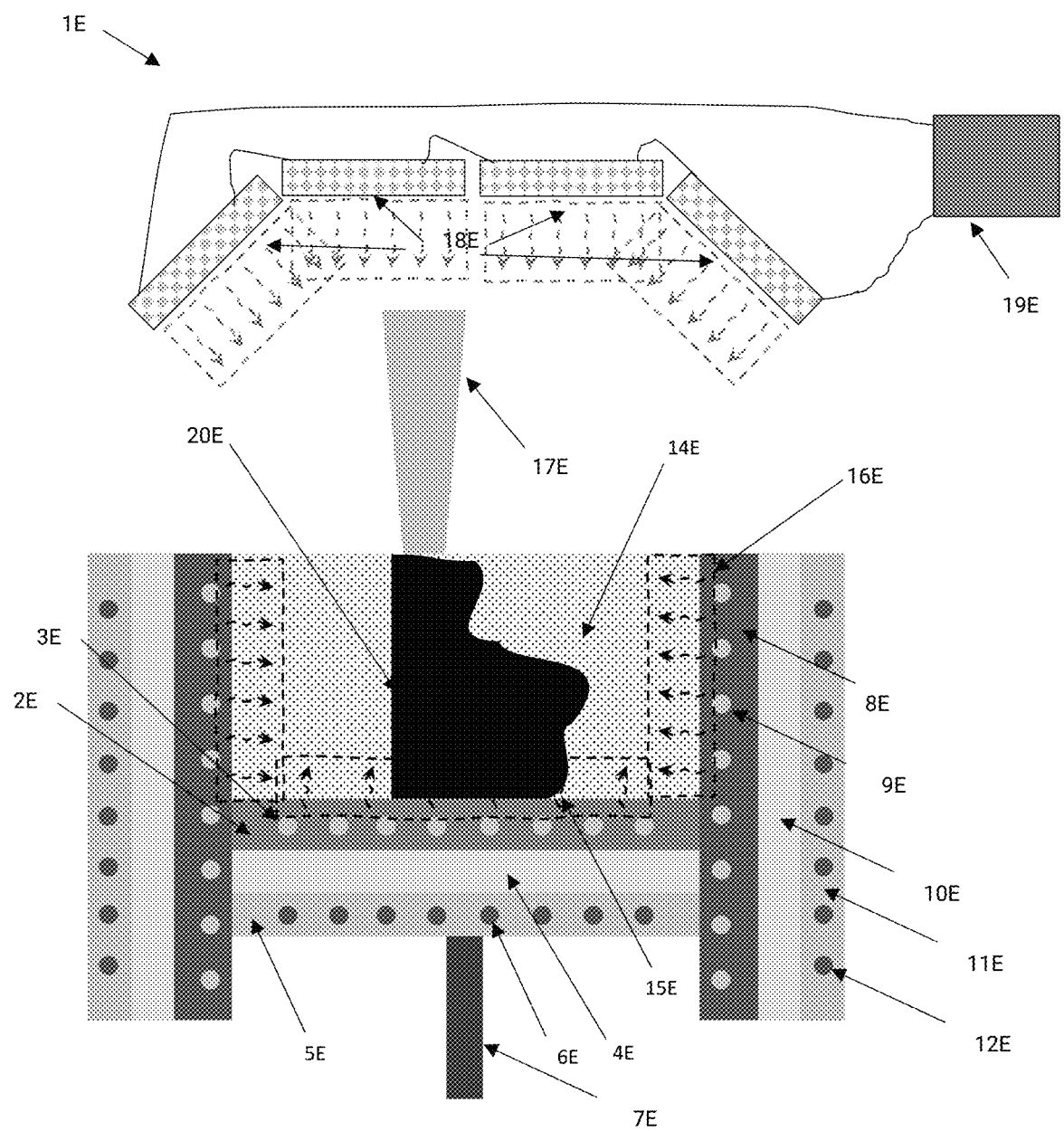
FIG. 1E illustrates use of a segmented infrared heater for patterned heating.

FIG. 1E illustrates a system 1E supporting use of a segmented infrared heater for patterned heating suitable for use with a print chamber. Laser energy 17E proportional to the material to be printed is incident on the print plate 2E which contains heater cartridges 3E and temperature sensing devices for controlling the temperature of the print plate 2E. Below the print plate 2E, insulation 4E reduces heat loss. Below the insulation 4E is the cooling tube housing plate 5E which contains coolant flow 6E. The entire print plate assembly is connected to a z-axis motor by a shaft 7E. Heat flow 8E from a patterned radiative element is incident onto the print plate 2E from above. The magnitude of the heat flow 8E can be inversely proportional to the laser energy 17E. The printer side walls 9E contain heater elements 10E. Outside the printer side walls 9E is a layer of insulation 11E, outside of which is a print wall cooling tube side wall 12E which contains coolant flow 13E. Printed part 14E on the print plate is supported by the print plate 2E and surrounded by powder 15E. Conductive heat 16E from heater cartridge in print plate is applied to the printed part 20E. Conductive heater 17E from heater cartridge in the print wall is applied to the printed part and surrounding powder. In this embodiment, multiple segments of infrared heaters 18E are installed above the print plate 2E. Each segment is independently controlled such that portions of the print plate can be heated. This mechanism can spatially modulate the temperature distribution on the print plate caused by the variation of printed surface from layer to layer. All infrared heater segments can also work together to temporally modulate the overall thermal load variation caused by the variation of laser energy delivered to the bed from layer to layer. The heaters receive power from a power source 19E and can be connected in series or parallel.

Figure 1F:
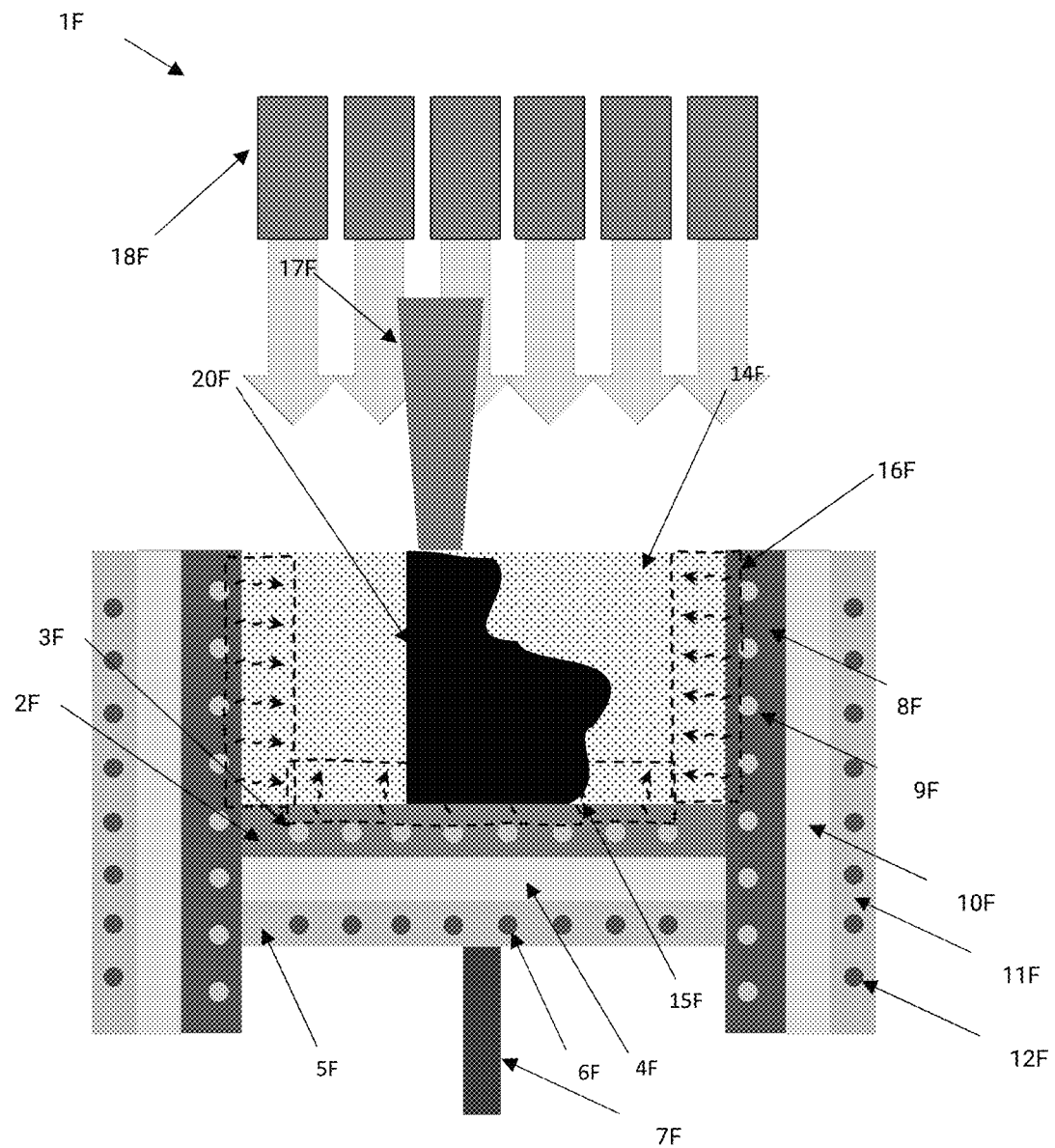
FIG. 1F illustrates use of a segmented top-down or angle gas flow for patterned heating.

FIG. 1F illustrates use of a segmented top-down or angle gas flow for patterned heating. In this embodiment, the print chamber and general operation of system 1F is similar to that previously described with respect to FIG. 1E, with similar numbers indicating similar structures. In this embodiment, a vertical gas flow 18F can provide extra heating to the top surface. Using a segmented approach, spatially dependent temperatures can be tuned to some extent. This can be achieved through a series of units combined together, or from one unit with multiple sub-sections.

Figure 1G:
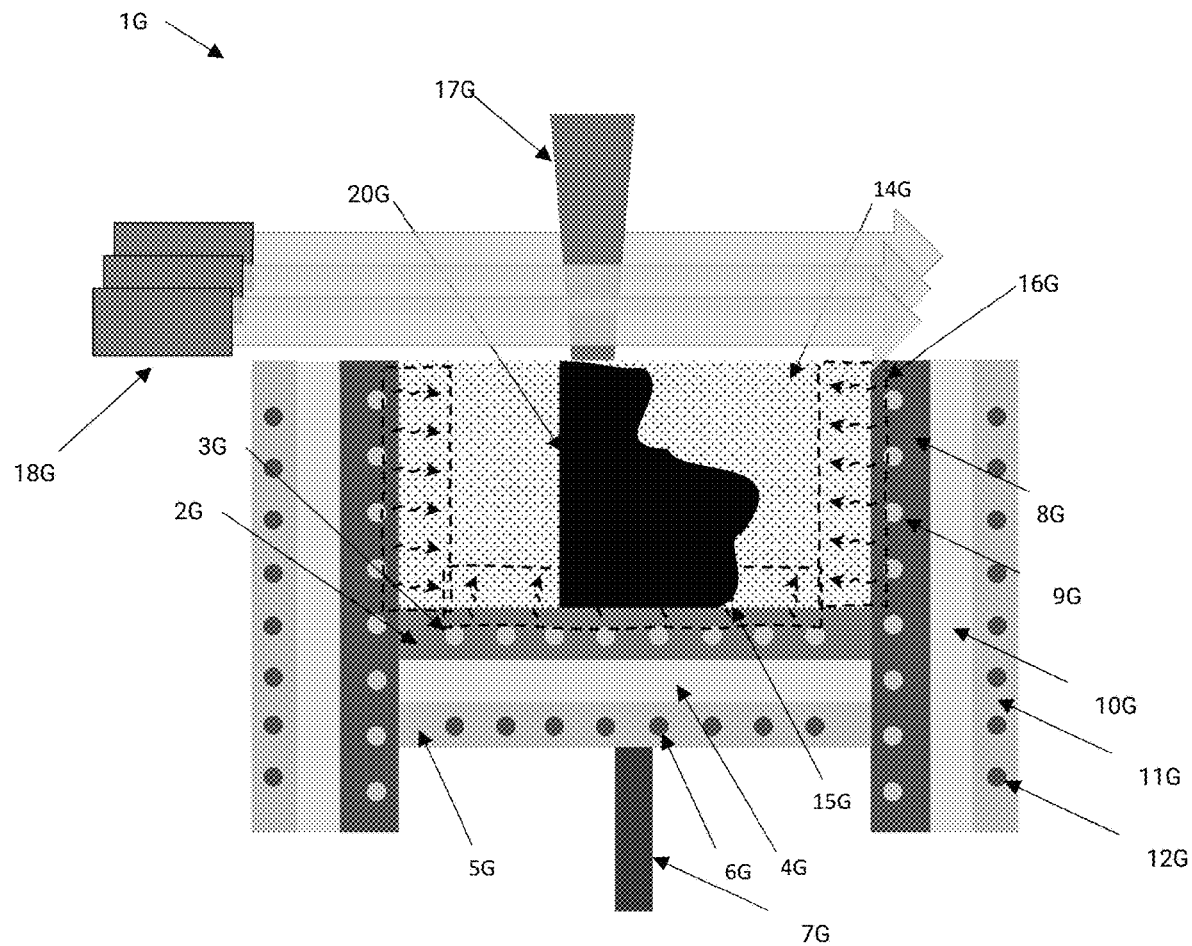
FIG. 1G illustrates use of a segmented cross bed gas flow for patterned heating.

FIG. 1G illustrates use of a segmented cross bed gas flow for patterned heating. In this embodiment, the print chamber and general operation of system 1G is similar to that previously described with respect to FIG. 1E, with similar numbers indicating similar structures. In this embodiment, a horizontal gas flow 18G can provide extra heating to the top surface. Temperature of the gas flow can be modulated based on the variation of thermal load as printing goes on.

Figure 1H:
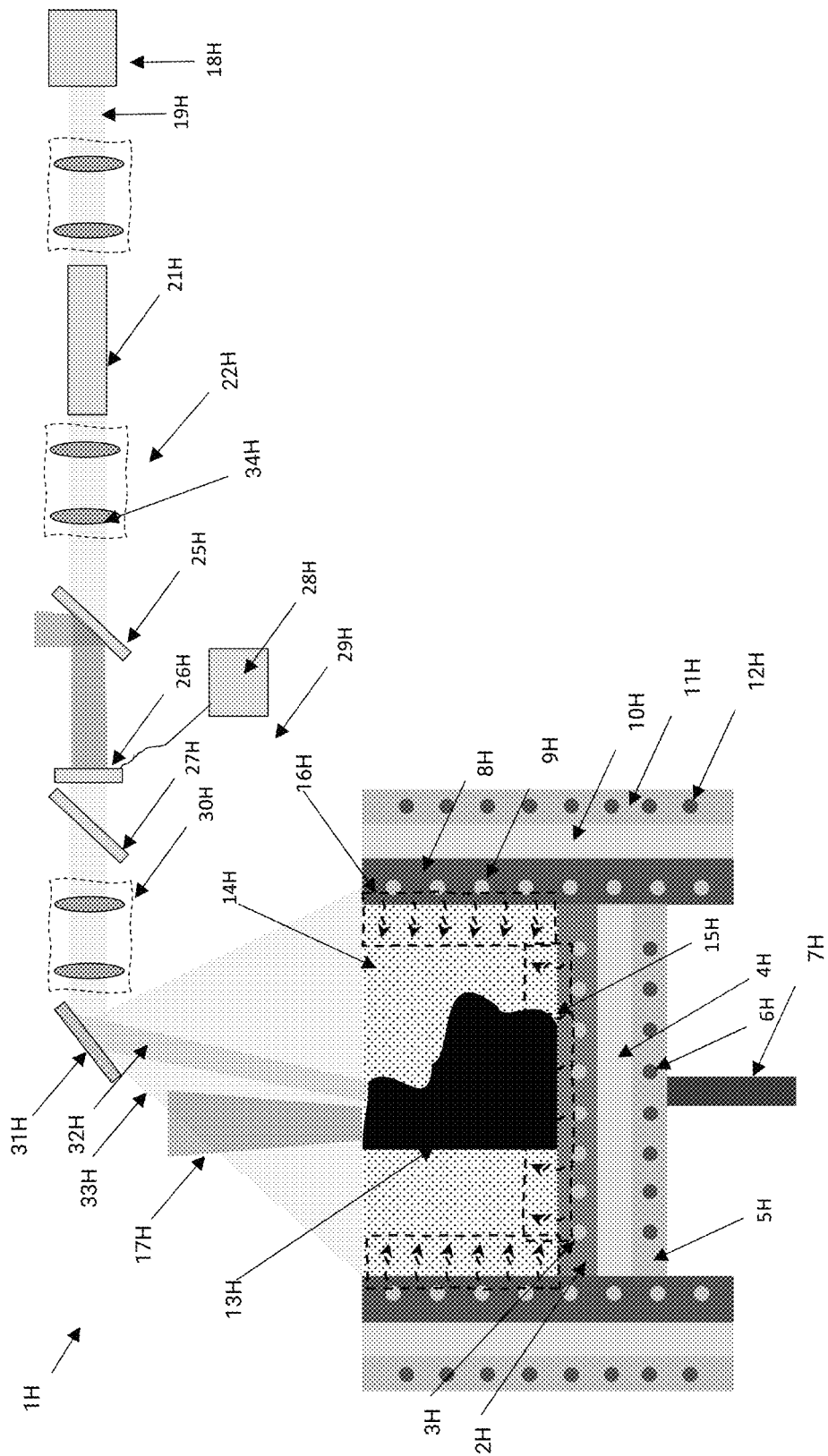
FIG. 1H illustrates use of additional heating laser(s) for patterned heating.
Figure 1L:
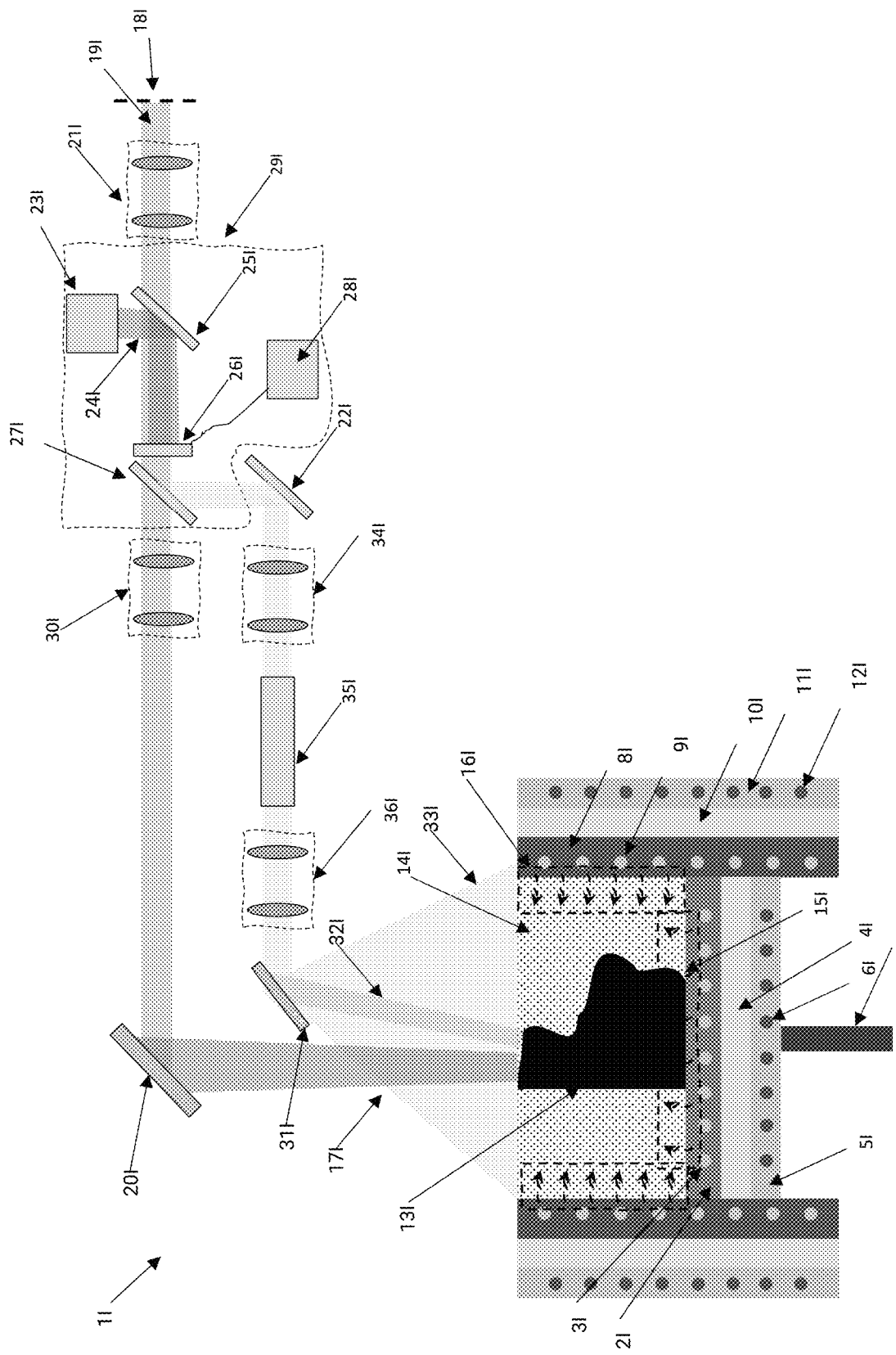
FIG. 1I illustrates use of additional heating laser(s) for unpatterned heating.
FIG. 1J illustrates use of additional heating laser(s) derived from recycled or rejected light for patterned heating.
FIG. 1K illustrates a thermography system using a camera and pyrometer.

FIG. 1H illustrates use of additional heating laser(s) for patterned heating in a system 1H. System 1H includes a print chamber system including a print plate 2H, heater cartridges 3H inside the print plate, insulation 4H below the print plate, a cooling tube housing plate 5h, and a cooling tube holding coolant 6H. A Z-axis shaft 7H is connected to a motor. A print wall or side wall 8H contains a heater cartridge 9H. There is insulation 10H outside the print wall, a cooling tube housing side wall/plate 11H, and a cooling tube 12H holding coolant. A printed part 13H is formed on the print plate from powder 14H spread on the print plate. Thermal conditions can be maintained in the system 1H at least in part using conductive heat 15H from the heater cartridge in print plate and/or conductive heat 16H from heater cartridge in print wall. Laser energy 17H can be proportional to print tile fill fraction (2×2 mm-10×10 mm).

An additional laser source provides focused energy to heat up smaller and more specific area of the print plate. The laser beam delivery can be fixed and optics set up to project to fill the entire plate, or the laser can be mounted on a scanning device such that it can scan cover the entire print plate. The laser can be patterned using a spatial light modulator such as an optically addressed light valve, DMD, or other patterning device. The laser may need to be homogenized before the SLM to allow for high uniformity of the beam. Homogenizers can be reflective tubes, TIR tubes, diffractive elements, lens let arrays, or similar. Geometry of the homogenizer is generally square but can be any geometrical shape configured to fit in a pattern.

Components include an additional laser source 18H (scanning and/or fixed & patterned). A beam 19H is emitted from a laser source and directed toward a relay optic assembly 20H between laser source 18H and laser homogenizer 21H. In some embodiments, an image relay optic assembly 34H is positioned between the laser homogenizer and the light valve. A homogenized beam 22H emitted from laser homogenizer is directed into a patterned address light source 23H for light valve at 445 nm wavelength. Blue light 24H emitted from patterned address light source is directed into a Blue/IR combiner 25H to co-linearly align blue and IR lasers/light sources. A light valve 26H for patterning makeup heat laser source passes some light to a polarizer 27H for rejecting unused light not included in the pattern. Components can also include an electrical drive source 28H for light valve operation that, along with components 25H, 26H, 27H together form a patterning unit assembly 29H. Light from the patterning unit assembly 29H is directed into an image relay optic assembly 30H for relaying the light valve patterned image to the powder bed. A turning mirror 31H is used for directing light into the build chamber, or otherwise controlling where the laser light goes. A laser beam 32H can reflect off of scanning mirror and be focused to a sub-portion of the print bed for thermal management of print bed. Alternatively, a laser beam 33H reflecting off a fixed mirror can be focused to the full print bed area (or a substantial fraction of it)

FIG. 1I illustrates use of additional heating laser(s) for unpatterned heating. In this embodiment, the print chamber of system 1I is similar to that previously described with respect to FIG. 1H, with similar numbers indicating similar structures. As illustrated, a laser area printer can include input from homogenized image plane 18I. The laser has already been homogenized to arrive at this plane either through a reflective tube, TIR tube, diffractive optic, lenslet array, or similar mechanism. From plane 18I, beam 19I, which has a single majority polarization state, propagates to an image relay optic assembly 21I which changes the size of the beam at plane 19I and recreates its intensity profile on the light valve 26I. En route to the light valve 26I, beam 19I also passes through a beam combiner 25I which combines patterned blue light 24I at 445 nm emitting from projector unit 23I, with the infrared beam 19I at 1000/1064 nm. Both beams are incident upon the light valve 26I which allows the pattern on the blue beam 24I to be transferred in polarization space to the infrared beam 19I. This action by the light valve 26I forms two majority polarization states in the beam in the desired pattern according to the dynamically adjustable projector unit 23I. Upon hitting the polarizer 27I, the beam is split into both negative and positive images. The positive image is transmitted to optical image relay lens assembly 30I which relays the light valve positive image to the print bed in the desired tile size by reflecting off of movable gimbal mirror 20I. F-Theta optics may be present in some configurations between the mirror 20I and the print bed. The negative image is reflected off polarizer 27I to be incident on mirror 22I which directs the negative image light to an image relay 24I which couples the light into the rejected light homogenizer 35I. In some instances, mirror 22I is also a dichroic filter, allowing 1064 nm light to pass through it and only reflecting 1000 nm light. The goal in this instance is to use separate methods to homogenize lasers of different types. A tube homogenizer is suitable for homogenizing relatively long pulse, low coherence, low intensity light whereas diffractive elements are better suited for homogenizing low divergence, high coherence light. At the output of the rejected light homogenizer 35I, the homogenized image is passed to the final rejected light image relay which performs an image relay operation between the rejected light homogenizer 35I output and the print bed. This image relay can be fixed, or dynamically adjustable to change the focus. The focus can be tight such that a small fraction of the bed is illuminated, or it can be large such that the entire bed is illuminated. The final turning mirror 31I can be fixed or allowed to move to further accommodate the make-up heat delivery process.

Figure 1J:
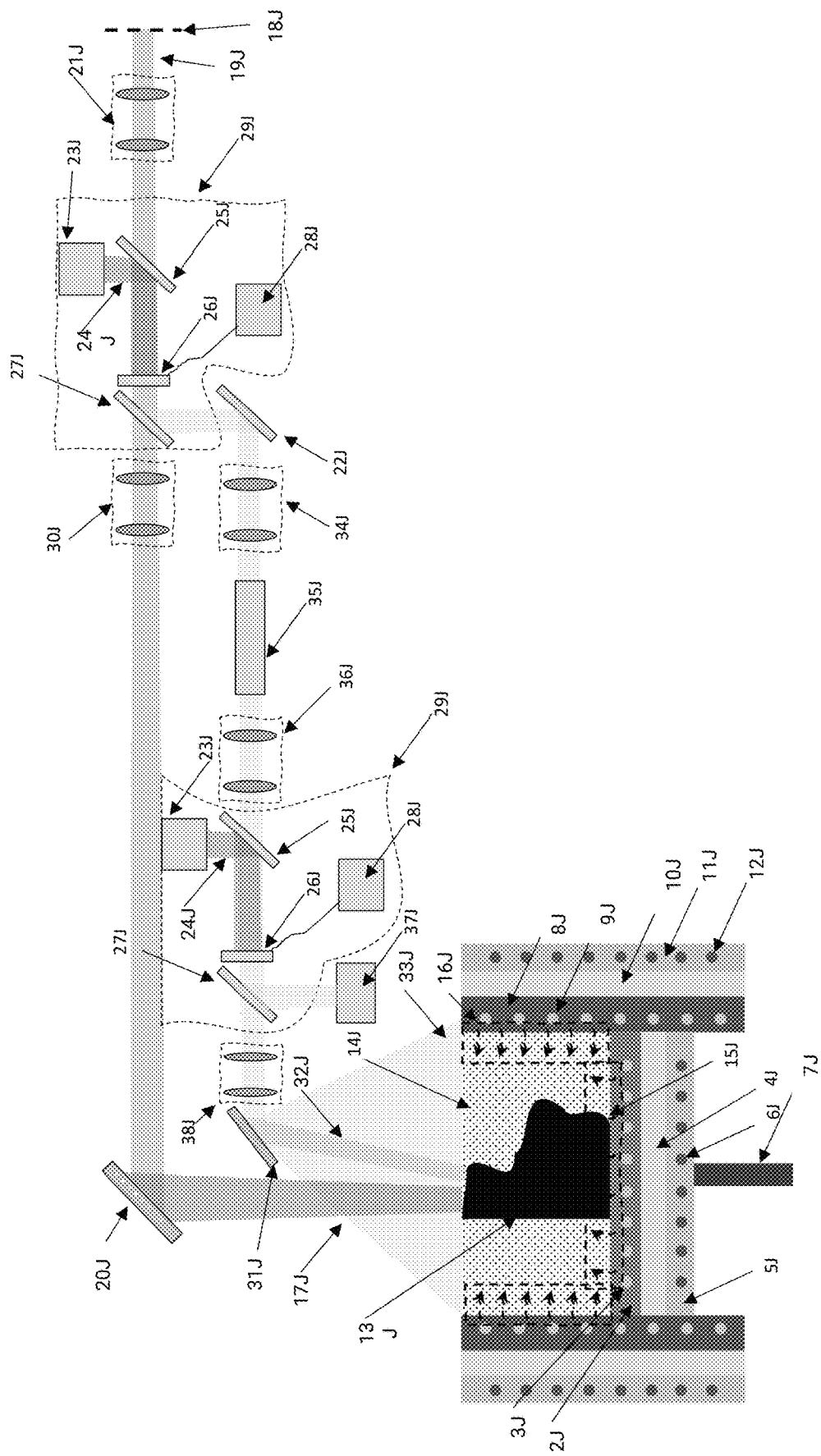

FIG. 1J illustrates use of additional heating laser(s) derived from recycled or rejected light for patterned heating. In this embodiment, the print chamber of system 1I is similar to that previously described with respect to FIGS. 1H and 1I, with similar numbers indicating similar structures. This figure shows the configuration for a laser area printer starting from an input homogenized image plane 18J. The laser has already been homogenized to arrive at this plane either through a reflective tube, TIR tube, diffractive optic, lenslet array, or similar mechanism. From plane 18J, beam 19J, which has a single majority polarization state, propagates to an image relay optic assembly 21J which changes the size of the beam at plane 19J and recreates its intensity profile on the light valve 26J. En route to the light valve 26J, beam 19J also passes through a beam combiner 25J which combines patterned blue light 24J at 445 nm emitting from projector unit 23J, with the infrared beam 19J at 1000/1064 nm. Both beams are incident upon the light valve 26J which allows the pattern on the blue beam 24J to be transferred in polarization space to the infrared beam 19J. This action by the light valve 26J forms two majority polarization states in the beam in the desired pattern according to the dynamically adjustable projector unit 23J. Upon hitting the polarizer 27J, the beam is split into both negative and positive images. The positive image is transmitted to optical image relay lens assembly 30J which relays the light valve positive image to the print bed in the desired tile size by reflecting off of movable gimbal mirror 20J. F-Theta optics may be present in some configurations between the mirror 20J and the print bed. The negative image is reflected off polarizer 27J to be incident on mirror 22J which directs the negative image light to an image relay 24J which couples the light into the rejected light homogenizer 35J. In some instances, mirror 22J is also a dichroic filter, allowing 1064 nm light to pass through it and only reflecting 1000 nm light. The goal in this instance is to use separate methods to homogenize lasers of different types. A tube homogenizer is suitable for homogenizing relatively long pulse, low coherence, low intensity light whereas diffractive elements are better suited for homogenizing low divergence, high coherence light. At the output of the rejected light homogenizer 35J, the homogenized image is passed to an image relay to the second patterning unit assembly which recreates the rejected image homogenizer 35J output onto the second light valve. The positive image of this new light valve is allowed to transmit through the entire rejected light patterning unit assembly to transmit to final image relay optics 38J which performs an image relay operation between the rejected energy light valve output and the print bed. This image relay can be fixed, or dynamically adjustable to change the focus. The focus can be tight such that a small fraction of the bed is illuminated, or it can be large such that the entire bed is illuminated. The final turning mirror 31J can be fixed or allowed to move to further accommodate the make-up heat delivery process.

Figure 1K:
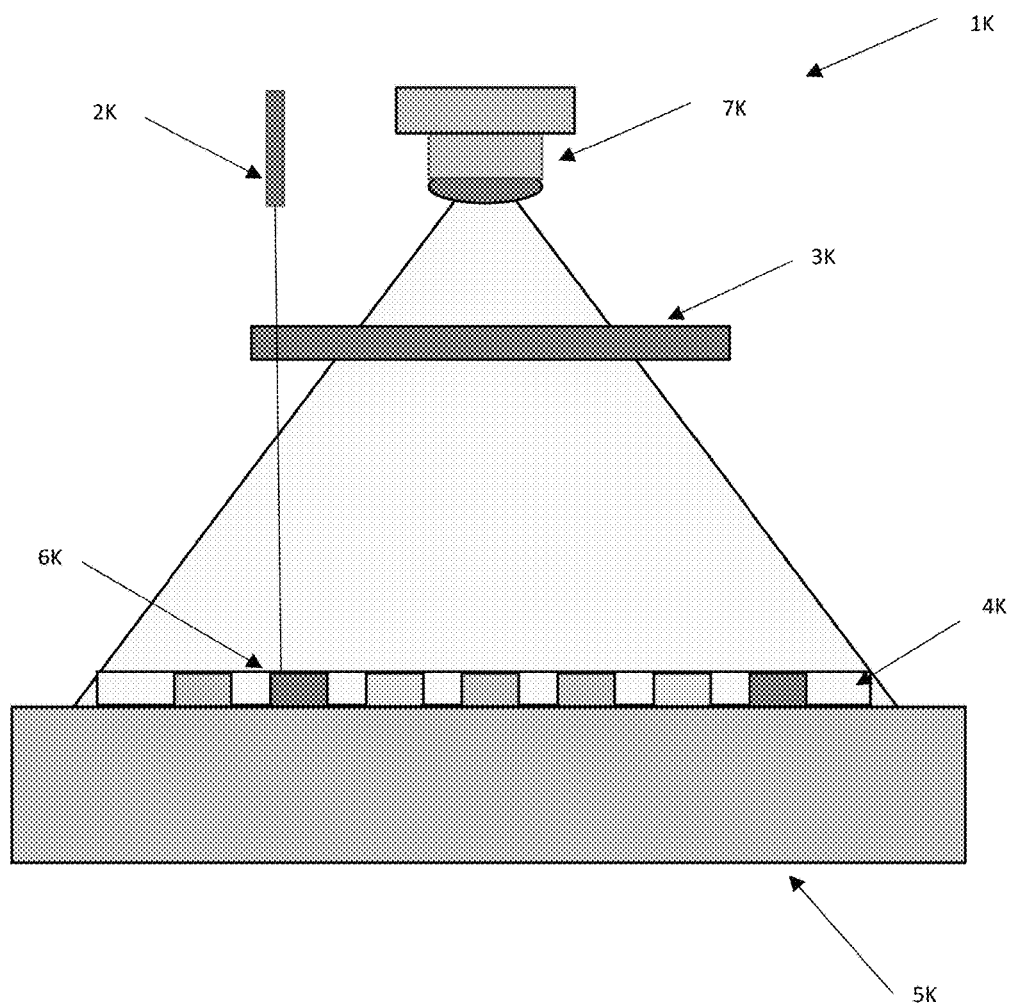

FIG. 1K illustrates a thermography system using a camera and pyrometer. Detailed thermography can be achieved on each layer of the print if desired. In one embodiment a color CCD or CMOS camera 7K is used to image the print bed 4K containing printed articles on top of a print substrate or print plate 5K. The resolution of the camera 7K is chosen to be enough to resolve printed part features to determine if there are temperature differentials across the layer. For example, if we choose a 16 Mpixel camera (4000×4000 pixels) can be used to image a 40 cm bed, providing pixel resolution of nominally 100 microns. A 64 Mpixel camera (8000×8000) can be used to provide 50 micron pixel resolution. In operation, due to the very high speeds associated with some embodiments of additive manufacturing systems, the average temperature of the print bed is relatively high. The bed 4K will visibly glow or glow in infrared camera systems. Even a modest temperature of 500C yields a blackbody curve with similar emission at 1050 nm to the red glow one visibly sees at 700C. Alternatively one can use a FLIR type camera. Temperature can be calibrated in the image by using an optical pyrometer 2K to benchmark the temperature at a single location 6I in the print bed. By taking a few temperature measurements with the pyrometer and correlating these with corresponding images it is possible to create a spatial temperature profile of the bed at low cost. Once calibrated the pyrometer is no longer strictly required and the images can be used as a stand-alone monitor of bed temperature. Images taken at the beginning and end of each recoating layer can be used to track recoating uniformity, print health, and the print temperature uniformity. If the temperature is too low or high, the control system can be used to correct the temperature nonuniformity or overall amplitude by adjusting the level of surface heating potentially with spatial dependence or adjust bed/wall heating levels as required to maintain the desired isothermal environment for the print. Typically, a window 3K is needed to protect the imaging equipment 2K and 7K from any powders, soot, dust, or other particulates that may come off the print bed 4K during the printing process.

Figure 2:
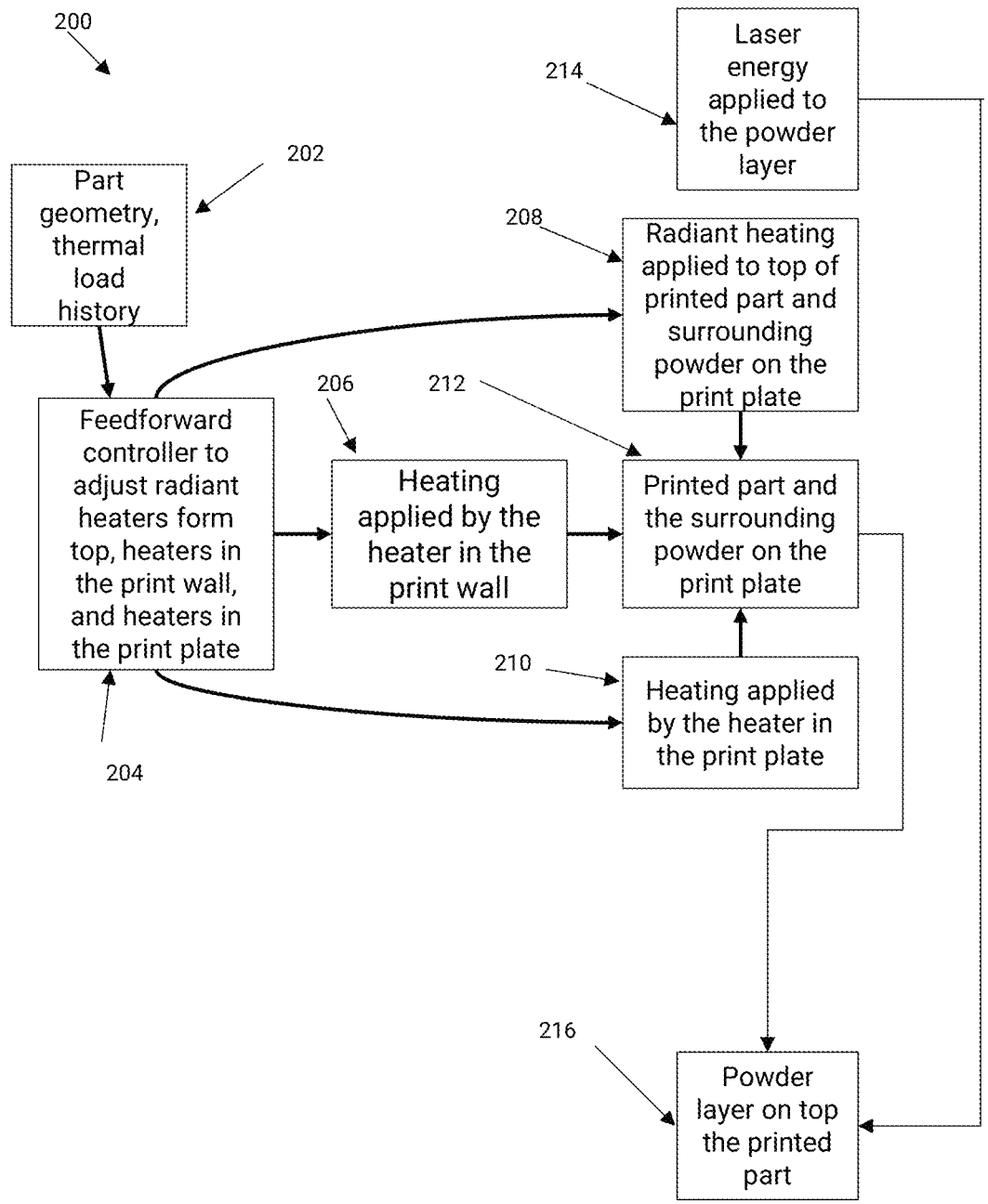
FIG. 2 illustrates process flow for a thermally controlled additive manufacturing system.

FIG. 2 illustrates process flow 200 and selected components for a thermally controlled additive manufacturing. system. In this embodiment, part geometry and printing thermal load history 202 are fed as input parameters. A feedforward controller 204 uses part geometry and print thermal load history to proactively generate control signals. Heater cartridge in print wall 206 applies heating to the printed part and surrounding powder. Radiant heater 208 applies heating to the printed part and surrounding powder. A heater cartridge in print plate 210 applies heating to the printed part and surrounding powder. Printed part 212 is supported by the print plate and surrounded by powder. Laser energy 214 is applied to the powder layer 216 to melt the powder and facilitate the solidification process.

Figure 3:
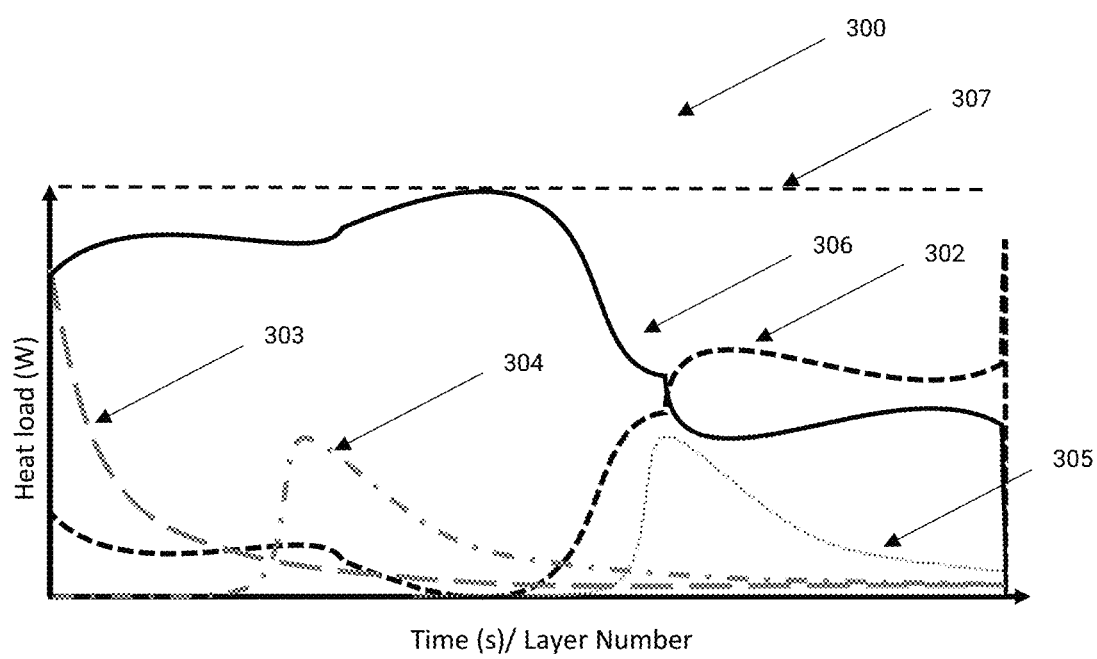
FIG. 3 illustrates a demonstration of a constant thermal load based on multiple patterned and applied thermal loads.

FIG. 3 illustrates a demonstration of thermal load on different part of the printing enclosure, with a combination of thermal load from differing sources being balanced to maintain substantially isothermal conditions for a printed part. Isothermal manufacturing conditions can reduce layer to layer variance in average heat load, prevent or reduce spatially dependent thermal warpage in all three dimensions, reduce higher residual stresses, and even prevent cracking of a printed part. Providing such isothermal conditions is seen with respect to an average thermal load as shown in graph 300 as a function of time or layer number on the bed from laser energy. Makeup energy 302 is required to balance the thermal load 306 from the patterning laser(s) such that total thermal load on the bed is constant (dotted isothermal line 307). For example, a thermal load 303 is applied to the print plate from below. Thermal load 304 is applied to a heater on the side wall ⅓ of the way down the print wall. Thermal load 305 is applied to a heater on the side wall ⅔ of the way down the print wall. When these thermal loads are added together, a substantially constant thermal load 307 is yielded. In some embodiments, the amount of patterned heat energy providing a thermal load is determined at least in part by printed part pattern. Additionally, supplied patterned heat energy can be provided in an amount that is substantially inversely related to fraction of the pattern printed. Typically, printing a relatively large with part or layer sub-portion (with respect to the print chamber or print bed) would require little supplied pattern heating energy, while printing a small part or layer sub-portion would require substantial supplied pattern heating energy.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims. It is also understood that other embodiments of this invention may be practiced in the absence of an element/step not specifically disclosed herein.

The invention claimed is:

1. A manufacturing system, comprising:
   a printer chamber having a printer bed that supports manufacturing materials, the printer chamber having an inner wall and an outer wall surrounding the inner wall with a layer of insulation sandwiched between the inner wall and the outer wall;
   an internal contact heating device built into the printer chamber and configured to direct a patterned heat energy onto the printer bed and the supported manufacturing materials; and
   an external heating device for the printer chamber and configured to direct the patterned heat energy onto the printer bed and the supported manufacturing materials,
   wherein the internal contact heating device comprises:
      a heating element embedded within the inner wall of the printer chamber that radiates the patterned heat energy into the printer chamber; and
      a cooling element embedded within the outer wall of the printer chamber that cools the outer wall of the printer chamber, the cooling element being isolated from the heater element by the layer of insulation sandwiched between the inner wall and the outer wall printer chamber.

2. The manufacturing system of claim 1, wherein the printer chamber further comprises a cartridge.

3. The manufacturing system of claim 1, wherein the internal heating device comprises at least one of heating elements and cooling elements.

4. The manufacturing system of claim 1, wherein the external heating device comprises infrared heating elements.

5. The manufacturing system of claim 1, wherein the external heating device comprises a heated gas flow.

6. The manufacturing system of claim 1, wherein the external heating device comprises at least one directed laser.

7. The manufacturing system of claim 1, wherein the external heating device comprises at least one directed laser to provide unpatterned heating.

8. The manufacturing system of claim 1, wherein the external heating device comprises at least one directed laser to provide patterned heating.

9. The manufacturing system of claim 1, wherein the external heating device comprises at least one directed laser that uses recycled light.

10. The manufacturing system of claim 1, further comprising a pyrometer.

11. The manufacturing system of claim 1, further comprising a camera.

12. A manufacturing system, comprising:
    a printer chamber having a printer bed configured to support a printable material layer of a plurality of layers of a printable material, the printer chamber having an inner wall and an outer wall surrounding the inner wall with an layer of insulation sandwiched between the inner wall and the outer wall;
    a primary laser source directable against a sub-portion of the printable material layer on the printer bed to print a part;
    an internal contact heating device built into the printer chamber and configured to direct a patterned heat energy onto the printer bed and the supported manufacturing materials; and
    a secondary heating device configured to direct a patterned heat energy into the printable material layer, wherein the secondary heating device comprises multiple segments of heaters, each heater of the multiple segments of heaters being independently controlled to heat a corresponding portion of the printer bed, and
    wherein the internal contact heating device comprises:
       a heating element embedded within the inner wall of the printer chamber that cools the outer wall of the printer chamber, the cooling element being isolated from the heater element by a layer of insulation sandwiched between the inner wall and the outer wall printer.

13. The manufacturing system of claim 12, wherein the patterned heat energy is determined at least in part by a pattern of the printed part.

14. The manufacturing system of claim 12, wherein the patterned heat energy is adjusted to provide thermal uniformity based on a pattern of the printed part.

15. The manufacturing system of claim 12, wherein the patterned heat energy is used to compensate for a spatial thermal non-uniformity in printing the part.

16. The manufacturing system of claim 12, wherein the patterned heat energy is adjusted multiple times during printing to provide thermal uniformity based on a pattern of the printed part.

17. The manufacturing system of claim 12, wherein the secondary heating device further comprises a second light emitting heating element.

18. The manufacturing system of claim 17, wherein the second light emitting heating element further comprises at least one of an arc lamp, infrared lamp, light-emitting diode (LED) heat device, or laser heat device.

19. The manufacturing system of claim 12, wherein the secondary heating device further comprises a printer chamber supported patterned heating element.

20. The manufacturing system of claim 19, wherein the printer chamber supported patterned heating element comprises at least one of an array of resistive heat cartridges, heated fluid in channels, electrically controlled plasma sources, arc heaters, induction heaters, or microwave heaters.

* * * * *